Feb. 25, 1958
W. B. DAVIS
2,824,651
DRILL HOLDERS
Filed Oct. 20, 1953
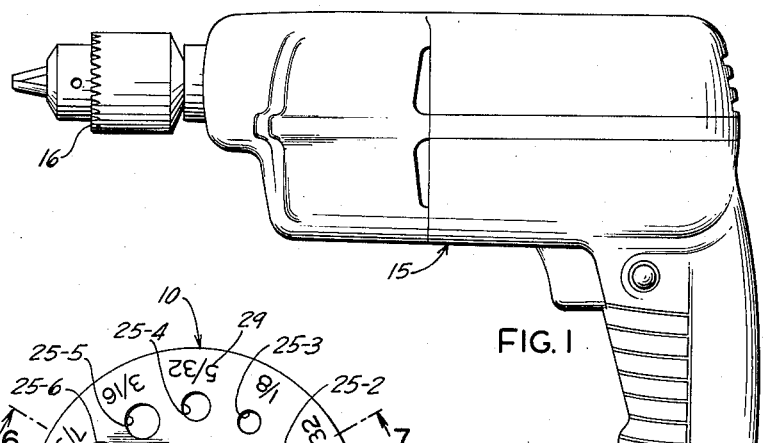
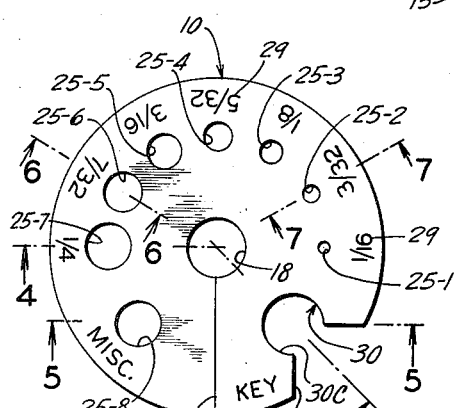
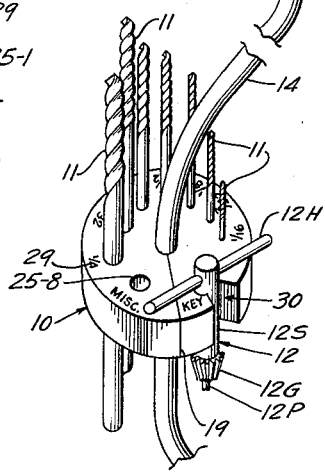
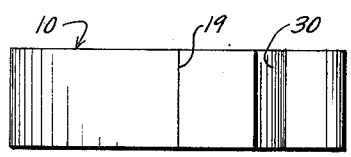
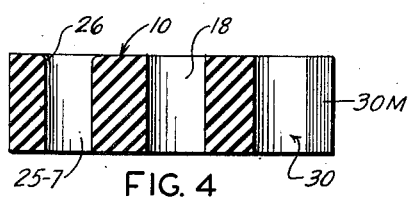
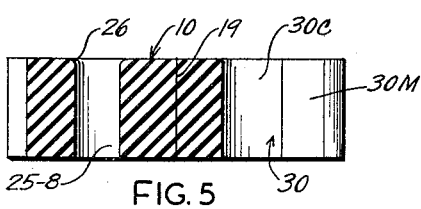
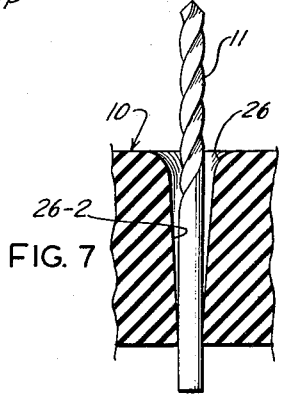
INVENTOR.
WALTER B. DAVIS
BY *Fred King*
ATTORNEY United States Patent Office 2,824,651
Patented Feb. 25, 1958

2,824,651

DRILL HOLDERS

Walter B. Davis, Chicago, Ill., assignor to Portable Electric Tools, Inc., Chicago, Ill., a corporation of Illinois Application October 20, 1953, Serial No. 387,207

8 Claims. (Cl. 211—69)

This invention relates to bit holders for holding an assortment of drill bits of the kind used in portable electric drills and the like.

Assortments of drill bits are ordinarily sold and stored in racks that are adapted for bench or wall mounting, and these racks are usually provided with a series of mounting openings or sockets into which the stems of the drill bits of the different sizes may be readily inserted. These prior drill bit holders usually require that the holder be mounted in a predetermined relationship, and hence when the user is performing drilling operations at a remote location with respect to the drill bit holder, it is somewhat troublesome when the drill bit must be changed to a different size. In view of the foregoing, it is the primary object of the present invention to afford a drill bit holder that may be readily and easily associated with a portable electric drill so that the drill bits will be readily available at the location where the portable electric drill is being utilized. More specifically, it is an object of the present invention to afford such a drill bit holder that may be readily and easily associated with or removed from such association with respect to the portable electric drill, and a related object is to afford such a holder wherein the drill bits are held firmly in position in the holder, thereby to simplify the use of a tool having the drill bit holder associated therewith.

Another and related object is to afford such a holder that also has provision for holding a chuck key of the kind utilized with geared chucks.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a perspective view showing a drill bit holder embodying the features of the invention and associated with portable electric drills;

Fig. 2 is a plan view of the drill bit holder;

Fig. 3 is a side elevational view of the holder;

Figs. 4 and 5 are transverse sectional views taken substantially along the lines 4—4 and 5—5 of Fig. 2;

Fig. 6 is an enlarged fragmental cross sectional view taken substantially along the line 6—6 of Fig. 2 and showing a bit mounted in one of the mounting pockets or openings of the holder; and Fig. 7 is an enlarged cross sectional view taken substantially along the line 7—7 of Fig. 2 and showing a smaller sized bit in the special opening provided for such small sized bits.

For purposes of disclosure, the invention is illustrated herein as embodied in a drill bit holder 10 that is adapted to hold a plurality of drill bits 11 of different sizes, along with a conventional chuck key 12, and this holder, under the present invention, is adapted to be readily and easily mounted upon and carried by the electric cord 14 of a conventional portable electric drill 15. The drill 15, as herein shown, is equipped with a conventional geared chuck 16, and is illustrated as being of the pistol grip type, although the holder of the present invention is adapted to be utilized with any type of portable drill.

The drill bit holder 10 of the present invention is in the form of a generally circular disc or hub, made from a resilient material such as natural or artificial rubber, or any of the usual rubber substitutes, the primary characteristic required being that of resilience. This hub may be formed by the usual processes of molding, and is provided with a central opening or bore 18 that is of a size equal to or somewhat less than the diameter of the electric cord 14 upon which the holder 10 is to be mounted. The holder 10 is formed with a radial slit 19 so that the hub actually constitutes what may be termed a "split collar," and when the holder 10 is to be placed upon an electric cord 14, the split collar is opened up along the slit or line of separation 19, and the electric cord 14 is forced into position within the central bore 18. The split collar is then allowed to close and the resilience thereof is sufficient to clamp the holder 10 on the cord 14.

About the central opening 18 and spaced outwardly therefrom, a plurality of drill receiving pockets 25—1 to 25—8 are formed by molding, and are arranged in spaced relation to each other in an annular series that is concentric with the central opening 18. The openings or pockets 25—3 to 25—8 are formed as uniform bores with a slight radius at 26 at their upper ends, as shown particularly in Figs. 4, 5 and 6, and these bores or pockets are made of different sizes so as to receive drills of different sizes or diameters as indicated by the legends at 29 that are formed by molding in the upper surface of the holder 10. The smaller sized openings 25—1 and 25—2 are preferably formed with a slight radius 26 at the upper end, but in this instance the opening, as 26—2 shown in Fig. 7, is tapered so as to facilitate the insertion of the small size drills 11 therein.

As will be evident particularly in Figs. 1 and 2, the holder 10 is also adapted to support the chuck key 12, which has a cross bar 12H and a stem 12S, at the bottom of which the usual gear 12G and pivot 12P are provided. For the purpose of receiving the chuck key 12, the holder 10 is provided with a side opening recess 30 that is formed in part by a circular opening 30C and a flared mouth 30M so that the inner end of the mouth is somewhat smaller than the diameter of the stem 12S of the key. The stem 12S of the key 12 may thus be forced into the side opening pocket 30 to the position shown in Fig. 1 of the drawings, and when this is done, the mouth of the slot closes about the stem 12S and holds the key 12 in this position.

With the drill holder of the present invention, the workman has all of the usual drill bits and the key readily available at all times, and these drill bits and the key are securely held in position due to the resilience of the material from which the holder is made.

From the foregoing description, it will be apparent that the present invention provides a drill holder that is extremely convenient in use in that it enables the workman to carry the necessary drill bits with him as he is performing the drilling operations. These bits are held securely in position, and the holder does not interfere with the normal uses of the drill.

Thus, while I have illustrated and described the preferred embodiments of my invention, it is to be under-

I claim:

1. A holder for drill bits adapted to be carried on the conductor cord of a portable electric drill comprising, a relatively thick disc of resilient material split radially and fashioned with an axial opening at the end of the split having a diameter such that the disc may be stably mounted about and grippingly engage said cord at a selected location by expanding the disc along the split and inserting the cord in said opening, and a plurality of multi-sized mounting sockets formed in the upper face of the disc for grippingly receiving and holding upright a similar number of drill bits having corresponding sizes.

2. A holder for drill bits adapted to be carried on the conductor cord of a portable electric drill comprising, a relatively thick block of resilient material with an axial opening therein having a diameter substantially equal to the diameter of the electric cord of such a drill, said block having a laterally opening slit formed radially with respect to and extended outwardly therefrom, whereby said block may be stably mounted about and grippingly engage said cord at a selected location by expanding the block along the split and inserting the cord in said opening, and a plurality of multi-sized mounting sockets formed in the upper face of the block for grippingly receiving and holding upright a similar number of drill bits having corresponding sizes.

3. A holder for drill bits adapted to be carried on the conductor cord of a portable electric drill comprising, a relatively thick disc of resilient material having a central opening formed therein of a diameter substantially equal to the diameter of the electric cord of such a drill, said disc being formed with a split from its edge to its central opening so that the disc may be stably mounted about and grippingly engage said cord at a selected location by expanding the disc along the split and inserting the cord in said opening, and a plurality of multi-sized mounting sockets formed in the upper face of the disc for grippingly receiving and holding upright a similar number of drill bits having corresponding sizes.

4. A holder for drill bits adapted to be carried on the conductor cord of a portable electric drill comprising, a relatively thick disc of resilient material split radially and fashioned with an axial opening at the end of the split having a diameter such that the disc may be stably mounted about and grippingly engage said cord at a selected location by expanding the disc along the split and inserting the cord in said opening, and a plurality of multi-sized mounting sockets formed in the upper face of the disc for grippingly receiving and holding upright a similar number of drill bits having corresponding sizes, at least selected ones of the mounting sockets in the upper face of the disc being formed slightly larger than the drill bits corresponding thereto to facilitate mounting of the drill bits, and then tapered gradually and materially to a smaller diameter toward the lower face of the disc for gripping the drill bit.

5. A holder for drill bits adapted to be carried on the conductor cord of a portable electric drill comprising, a relatively thick block of resilient material partially split transversely and fashioned with an axial opening at the inner end of the split having a diameter such that the block may be stably mounted about and grippingly engage said cord at a selected location by expanding the block along the split and inserting the cord in said openings, and a plurality of multi-sized mounting sockets formed in the upper face of the block for grippingly receiving and holding upright a similar number of drill bits having corresponding sizes, the smaller ones of the mounting sockets having the upper ends thereof formed slightly larger than the drill bits corresponding thereto to facilitate mounting of the drill bits, and then tapered gradually and materially to a smaller diameter for gripping a drill bit mounted therein.

6. A holder for drill bits adapted to be carried on the conductor cord of a portable electric drill comprising, a relatively thick disc of resilient material split radially and fashioned with an axial opening at the end of the split having a diameter such that the disc may be stably mounted about and grippingly engage said cord at a selected location by expanding the disc along the split and inserting the cord in said opening, a plurality of multi-sized mounting sockets formed in the upper face of the disc for grippingly receiving and holding upright a similar number of drill bits having corresponding sizes, and a mounting socket formed in and opening laterally through the periphery of the disc for receiving a chuck key and mounting and holding the same alongside the drill bits.

7. A holder for drill bits adapted to be carried on the conductor cord of a portable electric drill comprising, a relatively thick block of resilient material split transversely partially across the block and fashioned with an axial opening at the end of the split having a diameter such that the block may be stably mounted about and grippingly engage said cord at a selected location by expanding the block along the split and inserting the cord in said opening, a plurality of multi-sized mounting sockets formed to open through the upper face of the block for grippingly receiving and holding upright a similar number of drill bits having corresponding sizes, and a laterally opening mounting socket formed in the periphery of the disc for receiving and holding a chuck key.

8. A holder for drill bits adapted to be carried on the conductor cord of a portable electric drill comprising, a relatively thick disc of resilient material having an opening therethrough of a diameter substantially equal to the diameter of the electric cord of such a drill, said disc being formed with a split therein extending from said opening outwardly through the side of said disc so that the disc may be grippingly mounted on such a cord at a selected location by expanding the disc along the split and inserting the cord in said opening, a plurality of multi-sized mounting sockets formed in the upper face of the disc parallel to and arranged in an annular series about said opening for grippingly receiving and holding upright a similar number of drill bits having corresponding sizes, and a mounting socket formed in the disc for receiving and resiliently holding a chuck key.

References Cited in the file of this patent

UNITED STATES PATENTS

| | | |
|---|---|---|
| 2,260,086 | Matter | Oct. 21, 1941 |
| 2,263,277 | Schumann | Nov. 18, 1941 |
| 2,354,118 | Hansen | July 18, 1944 |
| 2,653,703 | Krauss | Sept. 29, 1953 |